United States Patent
Nasserbakht

[19]
[11] Patent Number: 6,122,703
[45] Date of Patent: Sep. 19, 2000

[54] GENERALIZED FOURIER TRANSFORM PROCESSING SYSTEM

[75] Inventor: Mitra Nasserbakht, Los Altos, Calif.

[73] Assignee: Amati Communications Corporation, San Jose, Calif.

[21] Appl. No.: 08/912,913

[22] Filed: Aug. 15, 1997

[51] Int. Cl.$^7$ .............................. G06F 12/00; G06F 17/14
[52] U.S. Cl. ................................. 711/5; 370/10; 708/404
[58] Field of Search ................. 711/5; 370/210; 364/726.02

[56] References Cited

U.S. PATENT DOCUMENTS

| | | | |
|---|---|---|---|
| 5,018,142 | 5/1991 | Simcoe et al. | 370/470 |
| 5,285,474 | 2/1994 | Chow et al. | 375/231 |
| 5,293,330 | 3/1994 | Sayegh | 708/406 |
| 5,365,470 | 11/1994 | Smith | 708/406 |
| 5,400,322 | 3/1995 | Hunt et al. | 370/468 |
| 5,473,665 | 12/1995 | Hall et al. | 379/29 |
| 5,680,394 | 10/1997 | Bingham et al. | 370/294 |
| 5,809,069 | 9/1998 | Polley et al. | 375/222 |
| 5,890,098 | 3/1999 | Kozaki et al. | 702/77 |

OTHER PUBLICATIONS

Johnson, L.G., "Conflict Free Memory Addressing for Dedicated FFT Hardware", IEEE Transactions on Circuits and Systems–II: Analog and Digital Signal Processing; vol. 39, No. 5, May 1992; pp. 312–316, May 1992.

Harper, III, David T., "Block, Multistride Vector, and FFT Accesses in Parallel Memory Systems", IEEE Transactions on Parallel and Distributed Systems; vol. 2, No. 1, Jan. 1991; pp. 43–51, Jan. 1991.

Oppenheim, et al., "Digital Signal Processing, " Prentice–Hall, Inc., Englewood Cliffs, New Jersey, Chapter 6 pp.284–328; 1975.

*Primary Examiner*—Reginald G. Bragdon
*Attorney, Agent, or Firm*—Beyer Weaver Thomas & Nguyen, LLP

[57] ABSTRACT

Improved Fourier transform processing systems for a data transmission system are disclosed. The improved Fourier transform processing systems efficiently performs Fourier transform signal processing. In addition, the improved Fourier transform processing can perform address transformations to better and more efficiently use a memory system for in-place processing. The address transformations are provided by a generalized address translation algorithm that works for any size Fourier transform, in any radix, and with various memory architectures. The processing system can also be pipelined. The invention is particularly well suited for performing in-place processing in a data transmission system.

21 Claims, 11 Drawing Sheets

GENERALIZED FOURIER TRANSFORM PROCESSING SYSTEM

BACKGROUND OF THE INVENTION

1. Field of the Invention

The present invention relates to data transmission systems, and more particularly, to efficient processing of data within data transmission systems.

2. Description of the Related Art

Bi-directional digital data transmission systems are presently being developed for high-speed data communications. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi-tone based approach for the transmission of digital data over twisted-pair phone lines. The standard, known as ADSL, is intended primarily for transmitting video data and fast Internet access over ordinary telephone lines, although it may be used in a variety of other applications as well. The North American Standard is referred to as the ANSI T 1.413 ADSL Standard (hereinafter ADSL standard), and is hereby incorporated by reference. Transmission rates under the ADSL standard are intended to facilitate the transmission of information at rates of up to 8 million bits per second (Mbits/s) over twisted-pair phone lines. The standardized system defines the use of a discrete multi-tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied.

The ADSL standard also defines the use of reverse transmissions at a data rate in the range of 16 to 800 Kbit/s. The reverse transmissions follow an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least about 6 Mbit/s and up to about 52 Mbit/s or greater in the downstream direction. Simultaneously, the Digital, Audio and Video Council (DAVIC) is working on a similar system, which is referred to as Fiber To The Curb (FTTC). The transmission medium from the "curb" to the customer is standard unshielded twisted-pair (UTP) telephone lines.

A number of modulation schemes have been proposed for use in the VDSL and FTTC standards (hereinafter VDSL/FTTC). For example, some of the possible VDSL/FTTC modulation schemes include multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation.

Most of the proposed VDSL/FTTC transmission schemes utilize frequency division duplexing of the upstream and downstream signals. One particular proposed VDSL/FTTC transmission scheme uses periodic synchronized upstream and downstream communication periods that do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. When the synchronized time division duplexed (TDD) approach is used with DMT it is often referred to as synchronized DMT (SDMT).

A conventional transmitter for a multicarrier modulation system encodes data onto each of a plurality of frequency tones, and then modulates the frequency domain data supplied by the data symbol encoder with an Inverse Fast Fourier Transform (IFFT) unit to produce time domain signals to be transmitted. The time domain signals are then supplied to a digital-to-analog converter (DAC) where the analog signals are converted to digital signals. Thereafter, the digital signals are transmitted over a channel to one or more remote receivers.

A conventional remote receiver for a multicarrier modulation system. The remote receiver receives analog signals that have been transmitted over a channel by a transmitter. The received analog signals are supplied to an analog-to-digital converter (ADC) which produces digital signals. The digital signals are then supplied to a Fast Fourier Transform (FFT) unit that demodulates the digital signals while converting the digital signals from a time domain to a frequency domain. The demodulated digital signals are then supplied to a data symbol decoder to recover the data, or bits of data, transmitted on each of the carriers (frequency tones).

Transceivers (transmitters and receivers) implementing multicarrier modulation typically have significant processing and memory requirements. Typically, the processing requirements are carried out by digital signal processing. In one implementation the multicarrier modulation is performed by processing by a Fast Fourier Transform (FFT) processor or an Inverse Fast Fourier Transform (IFFT) processor. Often, the FFT/IFFT processor is implemented by a digital signal processor (DSP). It is known that FFT/IFFT computations require that the processing interact with a plurality of data points simultaneously. FFT/IFFT computations are thus complicated processing operations that simultaneously use a plurality of data points that are not sequential.

As a result, in conventional designs, the FFT/IFFT processor is required to have numerous ports which connect to numerous ports of a memory system. Further, the outputs of the FFT/IFFT processor was in most cases hardwired back the memory system where the output values were stored. In general, the conventional designs require that the FFT/IFFT processor be able to access any location in the memory system at any time, which required numerous ports and complex wiring. Thus, conventional designs are costly due to the numerous ports required as well as due to the complex hardwiring required.

One improvement to the conventional designs that has been done is to use "in-place" processing so as to make efficient use of the memory system. In-place processing efficiently uses available memory by storing computed values in the locations from which the data values (used to produce the computed values) were originally retrieved. In other words, by using an in-place processing technique, the overall size of the required system memory could be reduced. The reduced size of the memory made possible by in-place processing is an improvement to the cost of the design. However, the conventional designs even with in-place processing require a lot of memory ports and complicated hardwiring so that the data stored in the memory system could be accessed at any time and at any location. Additionally, to effectuate in-place processing, the results from the FFT/IFFT processor have to be returned to and stored in the memory system at the same memory location from which the data points leading to these results were originally fetched. The providing of these return paths to the memory system is problematic because the wiring requirements are very complicated. In the case of FFT/IFFT computations, the retrieval and storage to the memory system is difficult because the samples used are not used sequentially.

FIG. 1 illustrates a simplified block diagram of a conventional FFT/IFFT processing system 100. The conventional FFT/IFFT processing system 100 includes a processor 102, a memory system 104, a series of multiplexers 106, and a series of demultiplexers 108. The FFT processing system 100 is capable of performing in-place processing with respect to the memory system 104. However, as seen in FIG. 1, to provide the in-place processing each bank (BANK-0, BANK-1, BANK-2 and BANK-3) of the memory system 104 required multiple ports (in this example, four input ports and four output ports). In addition, the series of multiplexers 106 and the series of demultiplexers 108 together with the complicated wirings to and from each of the banks of the memory system 104 render the design of the conventional FFT/IFFT processing system 100 difficult to implement and consume a large amount of expensive die area on a semiconductor chip. The complicated wirings also have unpredictable delays which create timing difficulties.

Thus, there is a need for improved FFT/IFFT processing systems.

SUMMARY OF THE INVENTION

Broadly speaking, the invention relates to improved Fourier transform processing systems. The improved Fourier transform processing systems efficiently perform Fourier transform signal processing. In addition, the improved Fourier transform processing according to the invention performs address transformations to better and more efficiently use a memory system for in-place processing. The address transformations are provided by a generalized address translation algorithm that works for any size Fourier transform, in any radix, and with various memory architectures. The invention also relates to pipelined in-place processing.

The invention is particularly well suited for performing in-place processing in a data transmission system. Specifically, in a data transmission system that provides multicarrier modulation with IFFT operations or provides multicarrier demodulation with FFT operations, the in-place processing techniques of the invention are particularly advantageous. As an example, the invention is particularly useful for VDSL systems and DMT-based systems. Moreover, the invention can provide pipelined FFT/IFFT processing for high-speed operation. In the case of a transceiver for a data communications system, pipelined FFT/IFFT processing according to the invention can perform back-to-back FFT and IFFT operations which allows the FFT processing system to be efficiently shared by both the transmitter and receiver of the transceiver.

The invention can be implemented in numerous ways, including as an apparatus, system, method, or computer readable media. Several embodiments of the invention are discussed below.

As a data processing apparatus for a data transmission system, an embodiment of the invention includes: an input buffer that stores data samples for a symbol in a sequential manner; a first address transformer, the first address transformer operates to transform the sequential manner of the data samples into a non-sequential manner such that sequential addresses of the data samples for the symbol stored in the input buffer are transformed into non-sequential addresses; a memory system having n-banks of memory, the memory system stores the data samples from the input buffer to the n-bank memory system in accordance with the non-sequential addresses produced by the first address transformer; a processor, the processor operates to compute output samples for the symbol, with the processor producing n-output samples using one of the data samples in each of the n-banks of memory of the memory system; a second address transformer, the second address transformer operates to transform the non-sequential manner of the output samples into a sequential manner; and an output buffer, the output buffer stores the output data samples in the sequential manner.

As a method for in-place processing of data in a data transmission system, an embodiment of the invention includes the operations of: receiving a sequential stream of data samples; storing the sequential stream of the data samples into an n-bank memory system in a non-sequential manner in accordance with non-sequential addresses for the n-bank memory system determined based on a number of banks of the n-bank memory system and a radix of operation; concurrently retrieving n-samples from the n-bank memory system, one sample from each of the n-banks; processing the n-samples retrieved from the n-bank memory system to produce n-processed samples; and storing the n-processed samples into the n-bank memory system at the same respective locations as the n-samples were retrieved from the n-bank memory system.

As a memory system, an embodiment of the invention includes: an address transformer, the address transformer operates to transform a sequential manner of data samples into a non-sequential manner such that sequential addresses of the data samples for a set of data are transformed into non-sequential addresses; and n-banks of memory, the n-banks of memory store the data samples in accordance with the non-sequential addresses produced by th e address transformer.

As a computer readable media containing program instructions for in-place processing of data in a data transmission system, an embodiment of the invention includes: first program instructions for receiving a sequential stream of data samples; and second program instructions for storing the sequential stream of the data samples into an n-bank memory system in a non-sequential manner in accordance with non-sequential addresses for the n-bank memory system determined based on a number of banks of the n-bank memory system and a radix of operation.

As a data processing apparatus for a data transmission system that uses a superframe for data transmissions, the superframe including at least one transmit frame, at least one receive frame and at least one quiet period, another embodiment of the invention includes: an input buffer that stores data samples for a symbol; a memory system, the memory system stores the data samples from the input buffer; control registers for defining the superframe for the data transmissions, thus allowing the apparatus to operate on various superframe formats; a processor, the processor operates to compute output samples for the superframe in accordance with the control registers; and an output buffer, the output buffer stores the output data samples.

The invention has numerous advantages. One advantage of the invention is that the memory system requires only one port per memory bank which results in a reduction in power and size of memory required, yet in-place computation is available. Another advantage of the invention is that the data samples are stored in the memory system in a non-sequential manner such that the data points can be easily fetched from the memory system in the order in which the FFT/IFFT processor requires them. Still another advantage of the invention is that complicated routing networks are not needed. Yet another advantage of the invention is that pipelined operation is facilitated such that multiple symbols can be concurrently processed, even a mixture of receive (FFT) and transmit (IFFT) symbols. Another advantage of the invention is that the superframe can be easily changed or boundary adjusted.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
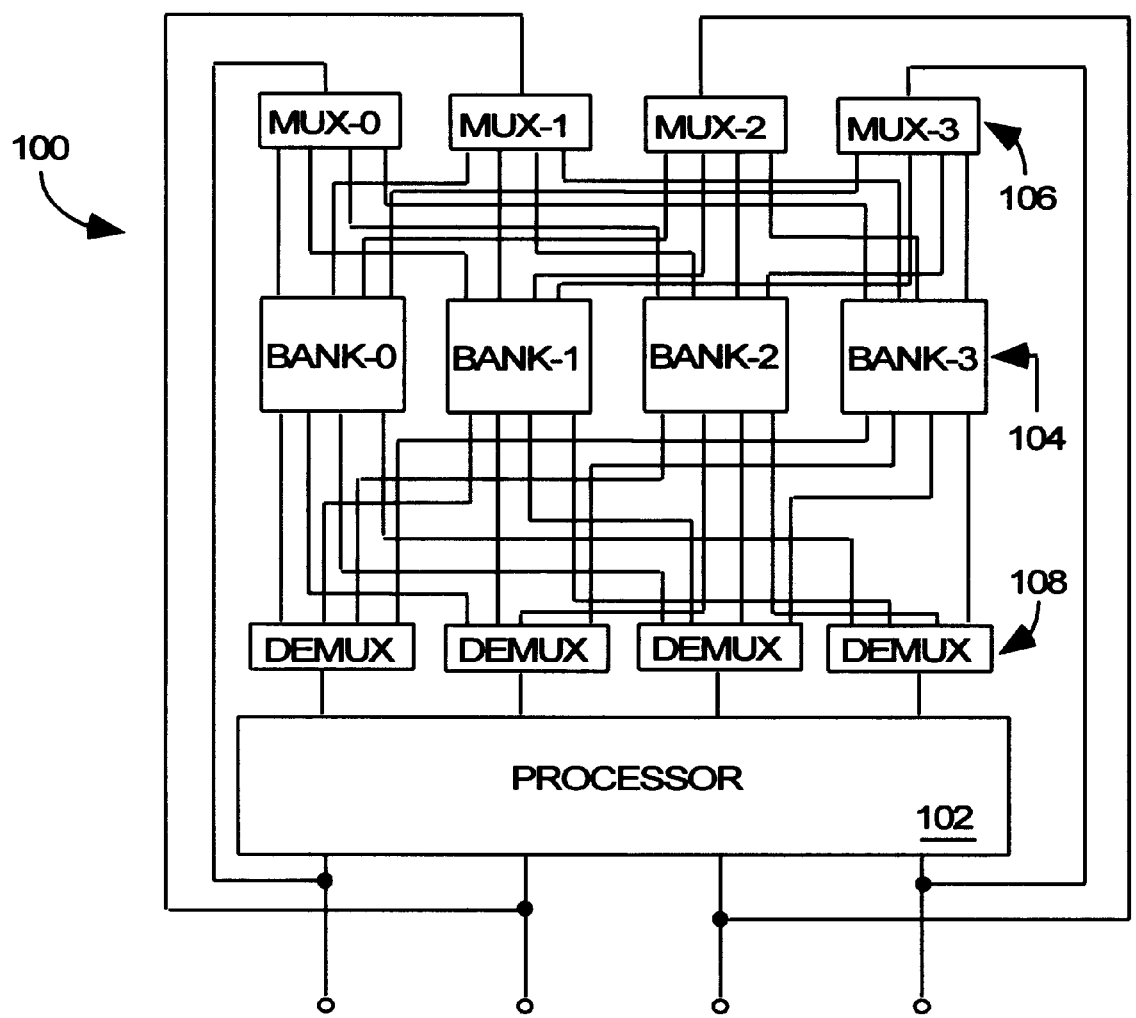
FIG. 1 illustrates a simplified block diagram of a conventional FFT processing system.

The invention relates to improved Fourier transform processing systems. The improved Fourier transform processing systems efficiently perform Fourier transform signal processing.

The invention is particularly well suited for performing in-place processing in a data transmission system. In-place memory utilization is designed to minimize the amount of storage area that a system must provide. Hence, by using in-place memory utilization, the cost for the storage area can be reduced. With complicated processing operations, such Fourier transforms, the amount of storage area reduction yielded by in-place memory utilization is substantial.

In a data transmission system that provides multicarrier modulation with IFFT operations or provides multicarrier demodulation with FFT operations, the in-place processing techniques of the invention are particularly advantageous. As an example, the invention is particularly useful for VDSL systems or DMT-based systems. Furthermore, the invention can provide pipelined FFT/IFFT processing for high-speed operation. In the case of a transceiver for a data transmission system, pipelined FFT/IFFT processing according to the invention can perform back-to-back FFT and IFFT operations which allows a FFT/IFFT processing unit to be efficiently shared by both transmitter and receiver of the transceiver.

Embodiments of the invention are discussed below with reference to FIGS. 2–11. However, those skilled in the art will readily appreciate that the detailed description given herein with respect to these figures is for explanatory purposes as the invention extends beyond these limited embodiments.

FFT/IFFT computations are computations of radix r. The radix r indicates that at any one time an FFT/IFFT processor operates on r points. According to the invention, a memory system used with the FFT/IFFT processor is divided into at least r banks of memory, with each bank preferably having one input port and one output port. In performing FFT or IFFT computations, N data points are operated on by the FFT/IFFT processor to produce output values. Due to the nature of Fourier transforms, the N data points are non-sequential data points. Hence, in order for the FFT/IFFT processor to utilize the banks of memory with a single input port and a single output port, the FFT/IFFT processor includes an address transformation unit that ensures that for each of the N data points simultaneously operated on by the FFT/IFFT processor only one data point is obtained from each of the banks of memory.

The address transformation unit implements a memory addressing scheme that generates contention-free storage for a FFT/IFFT processor of size N-points. The memory addressing scheme works for a generalized radix-r case, where $N=r^a$, provided the memory system is divided into r memory banks, where a is an integer.

As previously noted, the memory addressing scheme according to the invention is particularly suited for "in-place" memory requirements. The memory addressing scheme also facilitates the generation of twiddle factors for the FFT/IFFT computations. Twiddle factors are multiplier elements that are pre-computed for any fixed N and r FFT/IFFT processor. The twiddle factors also are processed in a non-sequential but predetermined manner which is similar to but different from the non-sequential processing of the N-data points.

There are two general requirements for the memory addressing scheme. First, only memory locations that are being read in the current "FFT cycle" are permitted to be overwritten in the next cycle. Second, the destination address (i.e., write locations) are non-sequential such that data points required for all the following butterfly stages reside in different memory banks.

The address transformation process works the following way. The memory system is divided into r banks. The range of addresses for each bank is from 0 to N/r. Each data point in a butterfly structure can be uniquely represented with time index (n) and frequency index (k). By generally representing N as N1*N2, and using the time and frequency indices as, $n = n1\, N2 + n2,$ $k = k1 + N1\, k2,$ where $0 \leq n1, k1 \leq N1-1$, $0 < n2$, and $k2 \leq N2-1$.

A FFT transformation index map can be constructed as follows in Table 1 below, with n2 indexing the rows and k1 indexing the columns.

TABLE 1

| | k1 | | | |
|---|---|---|---|---|
| n2 | 0 | 1 | ... | y = (logN) − 1 / r |
| 0 | X[0,0] | X[0,1] | ... | |
| 1 | X[1,0] | | ... | |
| 2 | X[2,0] | | ... | |
| . | . | . | . | . |
| . | . | . | . | . |
| . | . | . | . | . |
| x = (N/r) − 1 | X[(N/r) − 1,0] | | ... | X[(N/r) − 1,(logN) − 1] / r |

The following operations determine the specific bank the data points are to be stored in, and the address (location) within that bank where the data points are to be stored. In one embodiment, the entire memory space is utilized, and the assignments are unique and remain fixed for the entire FFT/IFFT operation.

Let 'ni' and 'ki' represent the radix-r digits of the two indices (n,k) for each data point. Then, the following Equation (1) is used to determine the memory bank (B).

$$B = (n0 + n1 + \ldots + nx + k0 + k1 + \ldots + ky) \bmod r \quad (1)$$

Once the memory bank is assigned to eliminate address overwrites, the addressing within the bank must be done in such a way to enable proper data access in each FFT/IFFT cycle. That is accomplished by determining the address (A) by the following Equation (2).

$$A = (k0 + k1 + \ldots + ky) \bmod (N/r) \quad (2)$$

The operations of Equation (2) simplify to the following operations when the number of banks equals the radix.

$$A = (\text{data point}) \bmod (N/r)$$

As an example, Table 2 indicates memory bank (B) and address (A) assignments for two data points in a 256-point FFT with a radix-4.

TABLE 2

| Data Point | index {n,k} | B/A |
|---|---|---|
| 44 | [230,0] | 1/44 |
| 126 | [332,1] | 1/62 |

The computation of the bank (B) and address (A) for the two data points, 44 and 126, provided in Table 2 is explained below. For example, for the data point 44, the bank (B) is computed from Equation (1) as follows.

$B = (0 + 3 + 2 + 0) \bmod (4)$ $= 5 \bmod (4)$ $= 1$

Also, for the data point 126, the bank (B) is computed from Equation (1) as follows.

$B = (2 + 3 + 3 + 1) \bmod (4)$ $= 9 \bmod (4)$ $= 1$

The address (A) for the data point 44 is computed from Equation (2) as follows.

$A = (44) \bmod (256/4)$ $= 44 \bmod 64$ $= 44$

Also for the data point 126, the address (A) is computed from Equation (2) as follows.

$A = (126) \bmod (256/4)$ $= 126 \bmod 64$ $= 62$

Figure 2:
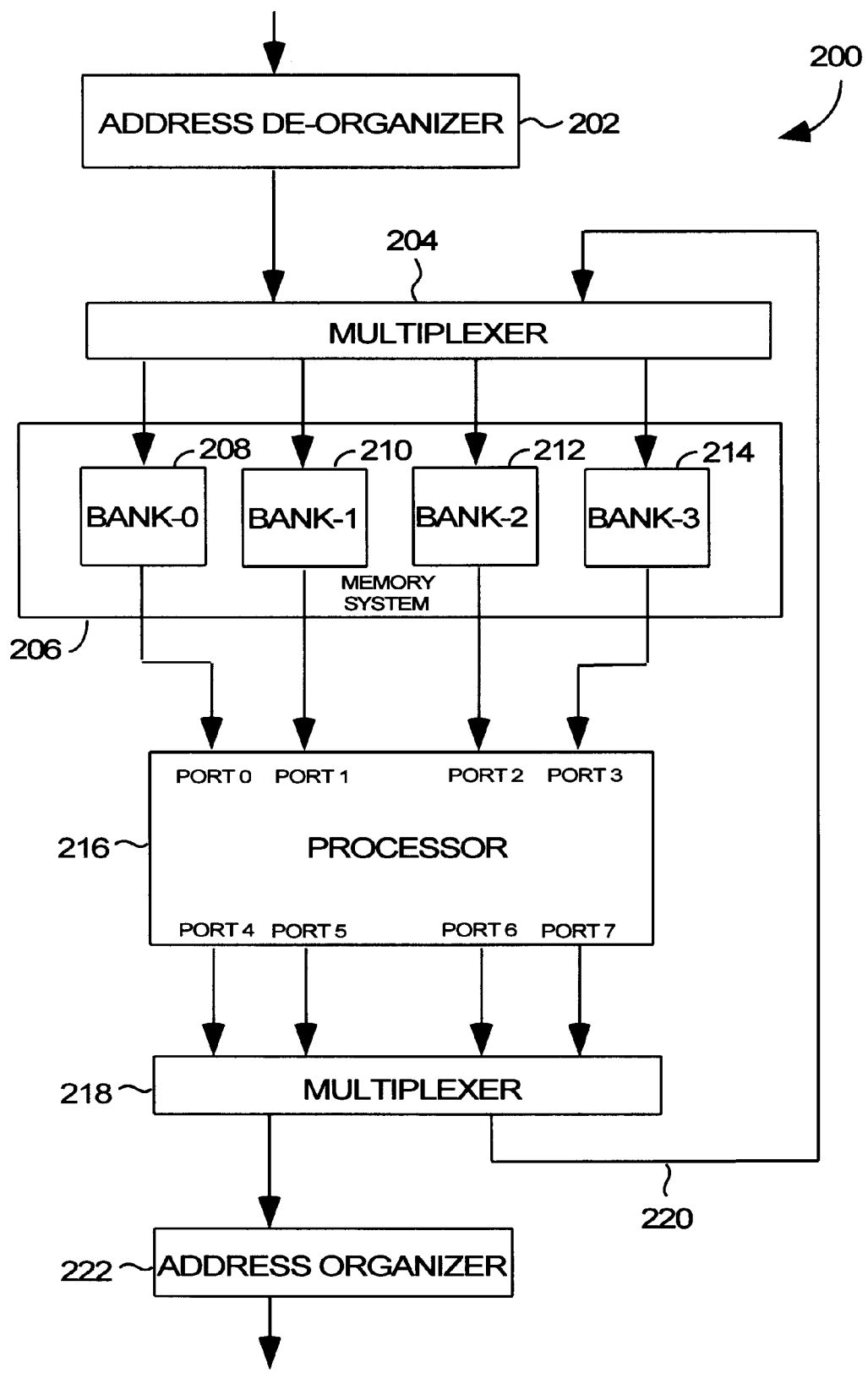
FIG. 2 is a block diagram of a pipelined processor according to a basic embodiment of the invention.

FIG. 2 is a block diagram of a pipelined processor 200 according to a basic embodiment of the invention. The pipeline processor 200 includes an address de-organizer 202 that receives a sequential stream of data samples and reorganizes the samples into a non-sequential organization. The resulting non-sequential samples are supplied to a multiplexer 204.

The pipelined processor 200 also includes a memory system 206. The multiplexer 204 couples the non-sequential samples to the memory system 206. The memory system 206 includes bank-0 208, bank-1 210, bank-2 212, and bank-3 214. Each of the banks 208–214 has the capability of storing an equal number of data samples. The incoming non-sequential data samples to the memory system 206 (via the address de-organizer 202 and the multiplexer 204) are stored to the respective banks 208–214 of the memory system 206 in a non-sequential manner.

The pipelined processor 200 further includes a processor 216 that couples to the memory system 206. The processor 216 includes various input ports that couple to various output ports of the memory system 206. More particularly, input port-0 (PORT0) is coupled to an output port of the bank-0 208, input port-1 (PORT1) is coupled to an output port of the bank-1 210, input port-2 (PORT2) is coupled to an output port of the bank-2 212, and input port-3 (PORT3) is coupled to an output port of the bank-3 214. During operation, the processor 216 is able to fetch a data sample from each of the banks 208–214 substantially simultaneously.

Although the pipelined processor 200 illustrated in FIG. 2 includes four banks of memory and the processor 216 includes four input ports and four output ports, the invention is generally applicable to processing systems having n-banks of memory and n-ports (input and output) for the processor. For ease of discussion it is assumed that n=4 such as depicted in FIG. 2. Such a design is particularly suited for a radix-4 operations. Hence, it is also assumed that the radix is four (4) though the invention is generally applicable to any radix operation.

In one embodiment, the processor 216 operates as a FFT computation engine to perform a N-point FFT or a M-point IFFT computation using the data samples stored in the memory system 206. Such FFT processing would be performed in this exemplary embodiment using four data samples at a time. For each set of four data samples being input to the processor 216, the processor 216 computes four output values. The output values are output by the processor 216 at output port-4 (PORT4), output port-5 (PORT5), output port-6 (PORT6), and output port-7 (PORT7), respectively. These output ports (PORT4, PORT5, PORT6 and PORT7) individually couple to a multiplexer 218. The multiplexer 218 can operate to forward the output values back to the multiplexer 204 via a feedback route 220. The feedback route 220 is provided to return the output values to the memory system 206 where they will be stored in the memory system 206. In one embodiment, the output values being returned to the multiplexer 204 are stored in the memory system 206 in an in-place manner such that the data values produced by the processor 216 are stored at the same locations in the memory system 206 from which the data samples used to compute the same data values were fetched.

The pipelined processor 200 also includes an address organizer 222. The multiplexer 218 can also forward the output data values to the address organizer 222. Generally speaking, when the output data values produced by the processor 216 are intermediate or non-final values, then the multiplexer 218 forwards the output data values back to the memory system 206 via the feedback route 220 and the multiplexer 204 for further computation. On the other hand, when the output data values produced by the processor 216 are the final values desired, then the multiplexer 21 8 forwards the output data values to the address organizer 222. The address organizer 222 operates in a manner opposite to that of the address de-organizer 202. In particular, the address organizer 222 operates to receive the output data values from the processor 216 which are non-sequential values given that the input data samples were non-sequential, and then reorganize the output data values into a sequential manner for their storage in an output buffer.

Figure 3:
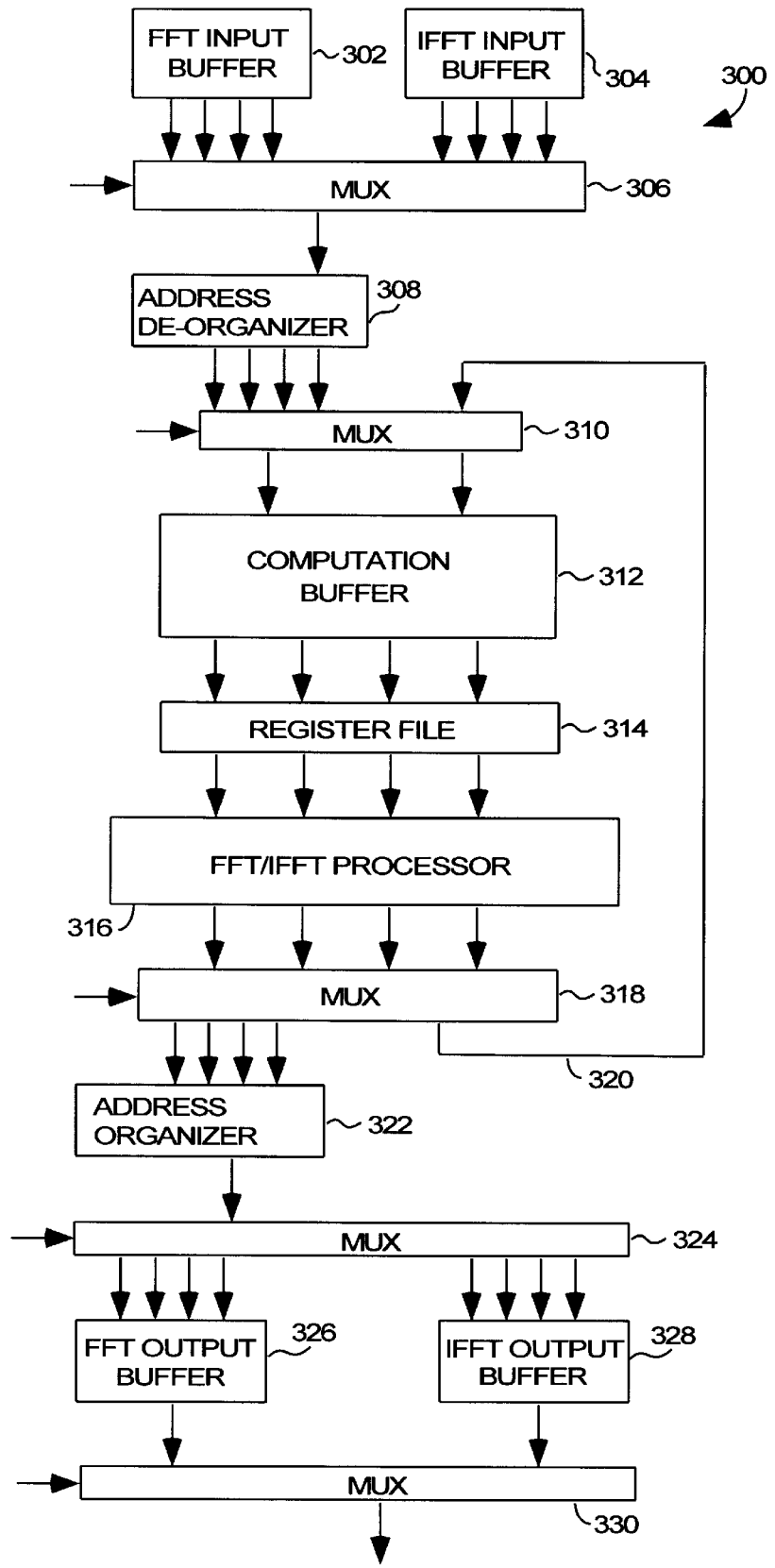
FIG. 3 is a block diagram of a super pipeline processor according to another embodiment of the invention.

FIG. 3 is a block diagram of a super pipeline processor 300 according to another embodiment of the invention. As an example, the super pipeline processor 300 is a computation or processing unit for a transceiver for a data communications system.

The super pipeline processor 300 receives its inputs from either a FFT input buffer 302 or an IFFT input buffer 304. The data samples stored in the FFT input buffer 302 correspond to a symbol to be transmitted. The data samples stored in the IFFT input buffer 304 correspond to a symbol that has been received in a transceiver including the super pipeline processor 300. A multiplexer 306 couples to the FFT input buffer 302 and the IFFT input buffer 304 and operates to select one of the input buffers 302, 304 for processing by the super pipeline processor 300. The sample data from the selected buffer 302, 304 is output by the multiplexer 306 to an address de-organizer 308. The address de-organizer 308 transforms the sequential data samples from the selected buffer 302, 304 into non-sequential data samples. The non-sequential data samples produced by the address de-organizer 308 are then supplied to a multiplexer 310. The multiplexer 310 supplies the non-sequential data samples to a computation buffer 312.

The computation buffer 312 stores the non-sequential data samples for subsequent stages of the super pipeline processor 300. In order to process the non- sequential data samples stored in the computation buffer 312, a group of the non-sequential data samples are retrieved from the computation buffer 312 and temporarily stored in a register file 314. In this embodiment, normally four data samples would be stored in the register file 314. A FFT/IFFT processor 316 fetches the group of the non- sequential data samples from the register file 314, and then operates to perform the appropriate Fourier transform, namely FFT or IFFT. The FFT/IFFT processor 316 produces output data values that are supplied to a multiplexer 318. The pipeline processor 300 is referred to as being super pipelined because the FFT/IFFT processor 316 is preferably itself pipelined as discussed below with reference to FIG. 7.

The multiplexer 318 can forward the output data values to the multiplexer 310 over a feedback bus 320. The feedback bus 320 is provided to route back the output data values from the FFT/IFFT processor 316 to the multiplexer 310 so as to enable storage of the output data values into the computation buffer 312. Preferably, when using the feedback bus 320, the output data values are stored back in the computation buffer 312 from the same place as which the fetch data values used to produce these output data values were retrieved from. Such processing is known as "in-place" processing because the output data is stored where the input data resides.

The multiplexer 318 can alternatively output the output data values to an address organizer 322. The address organizer 322 operates to reorganize the output data values for subsequent storage in a sequential manner. The sequential values produced by the address organizer 322 are forwarded to a multiplexer 324. The multiplexer 324 in turn forwards the sequential data values to either a FFT output buffer 326 or an IFFT output buffer 328. If the data values were originally supplied to the super pipeline processor 300 from the FFT input buffer 302, the FFT/IFFT processor 316 performs a FFT computation and the eventual sequential output values are subsequently stored in the FFT output buffer 326. Similarly, when the super pipeline processor 300 is processing data samples from the IFFT input buffer 304, the FFT/IFFT processor 316 performs an IFFT computation and the eventual sequential output values are subsequently stored in the IFFT output buffer 328. A multiplexer 330 is also coupled to the FFT output buffer 326 and the IFFT output buffer 328. The multiplexer 330 selects one of the output buffers 326, 328 as the output from the super pipeline processor 300 which is further processed by other portions of the transceiver.

Figure 4:
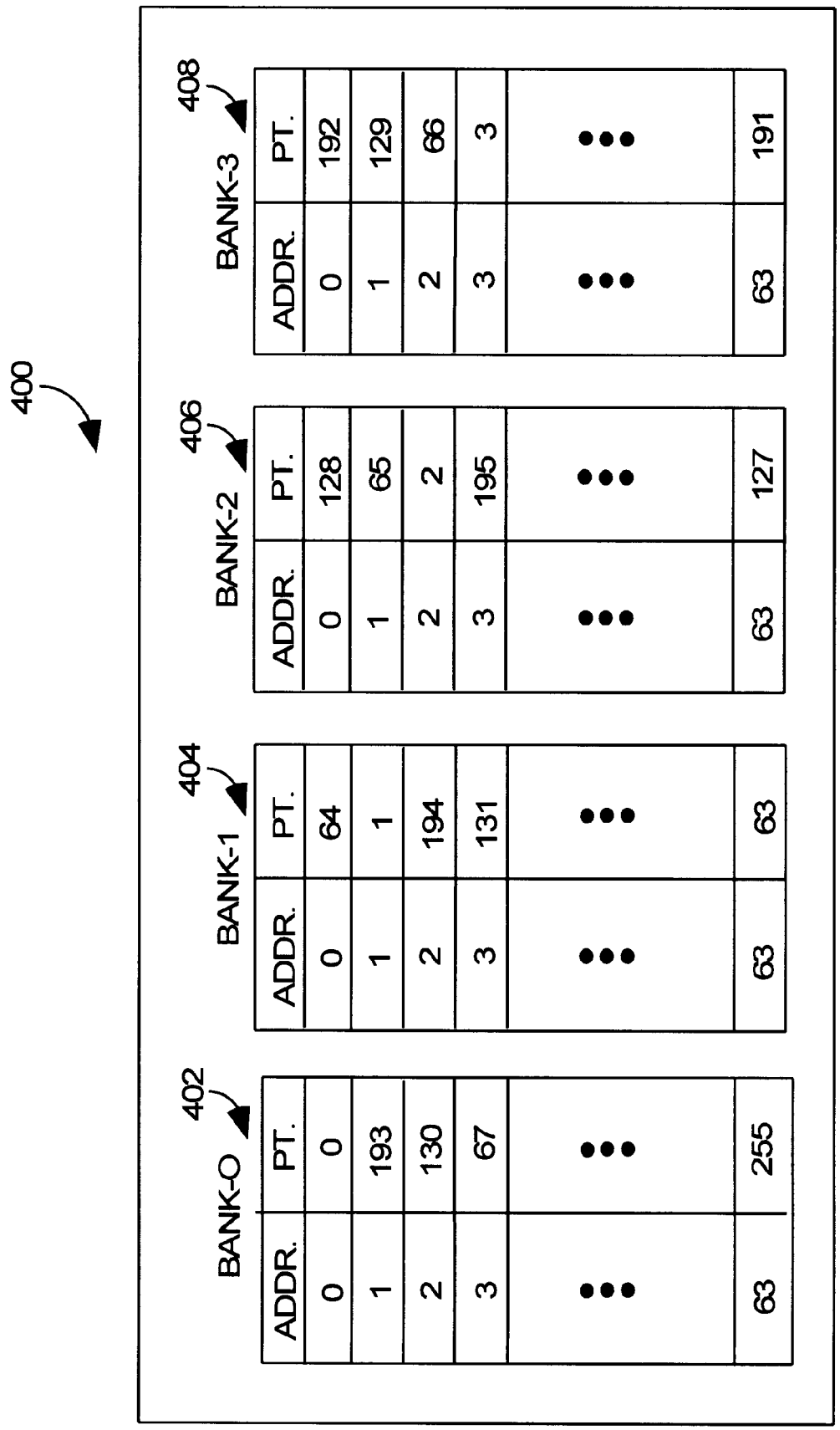
FIG. 4 is a diagram illustrating a computation buffer according to an embodiment of the invention.

FIG. 4 is a diagram illustrating a computation buffer 400 according to an embodiment of the invention. The computation buffer 400 illustrated in FIG. 4 is a representative embodiment of the computation buffer 312 in FIG. 3. In particular, the computation buffer 400 includes four (4) memory banks, bank-0 402, bank-1 404, bank-2 406 and bank-3 408. In this embodiment, it is assumed that the super pipeline processor is implementing a 256-point FFT/IFFT with a radix-4 approach. As shown in FIG. 4, each memory bank 402–408 is able to store 64 data samples (or points) in their respective sequential addresses, but the data samples (or points) being stored are not stored in a sequential fashion. For example, in address 0 of bank-0 402, data point "0" is stored, in the next subsequent address (namely, address 1) in bank-0 402 the data point "193" is stored, and in the next subsequent address (namely, address 2) in bank-0 402 the data point "130" is stored. Hence, the data points being stored in bank-0 402 are not sequential. The same follows for the storage of data points in the other banks of the computation buffer 400. Also, the data points stored across the data banks 402–408 are also not stored in a sequential manner. For example, at address 0 of bank-0 402, data point "0" is stored; at address 0 of bank-1 404, data point "64" is stored; at address 0 of bank-2 406, data point "128" is stored; and at address 0 of bank-3 408, data point "192" is stored.

Figure 5:
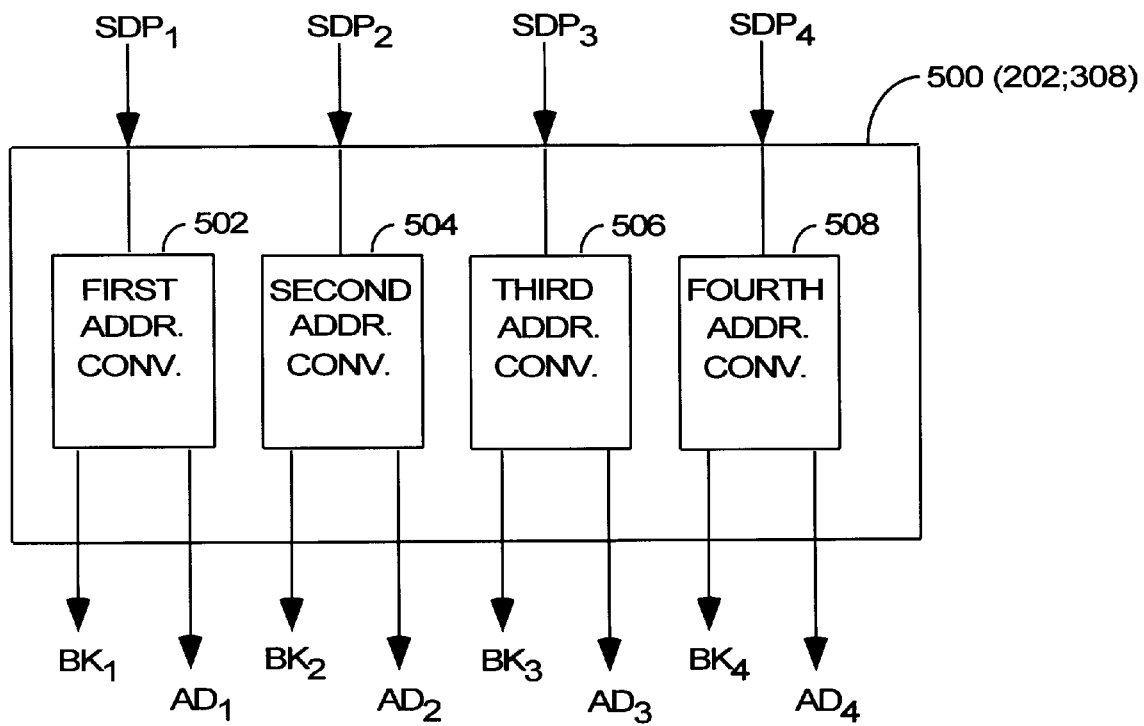
FIG. 5 is a block diagram of an address de-organizer according to an embodiment of the invention.

FIG. 5 is a block diagram of an address de-organizer 500 according to an embodiment of the invention. The address de-organizer 500 receives a series of sequential data points (SDP), namely $SDP_1$, $SDP_2$, $SDP_3$ and $SDP_4$, and respectively supplies the sequential data points (SDP) to a first address converter 502, a second address converter 504, a third address converter 506 and a fourth address converter 508. Each of the address converters 502–508 produces a bank (BK) and address (AD). More particularly, the first address converter 502 receives the first sequential data point ($SDP_1$) and produces bank $BK_1$ and address $AD_1$, the second address converter 504 receives the second sequential data point ($SDP_2$) and produces bank $BK_2$ and address $AD_2$, the third address converter 506 receives the third sequential data point ($SDP_3$) and produces bank $BK_3$ and address $AD_3$, and the fourth address converter 508 receives the fourth sequential data point ($SDP_4$) and produces bank $BK_4$ and address $AD_4$. The bank (BK) and address (AD) indicate where the respective data point is to be stored in the system memory 206, 312. In effect, the address converters 502–508 are transforming the sequential addresses for the sequential data points (SDP) into non-sequential addresses for purposes of facilitating efficient in-place processing.

Figure 6A:
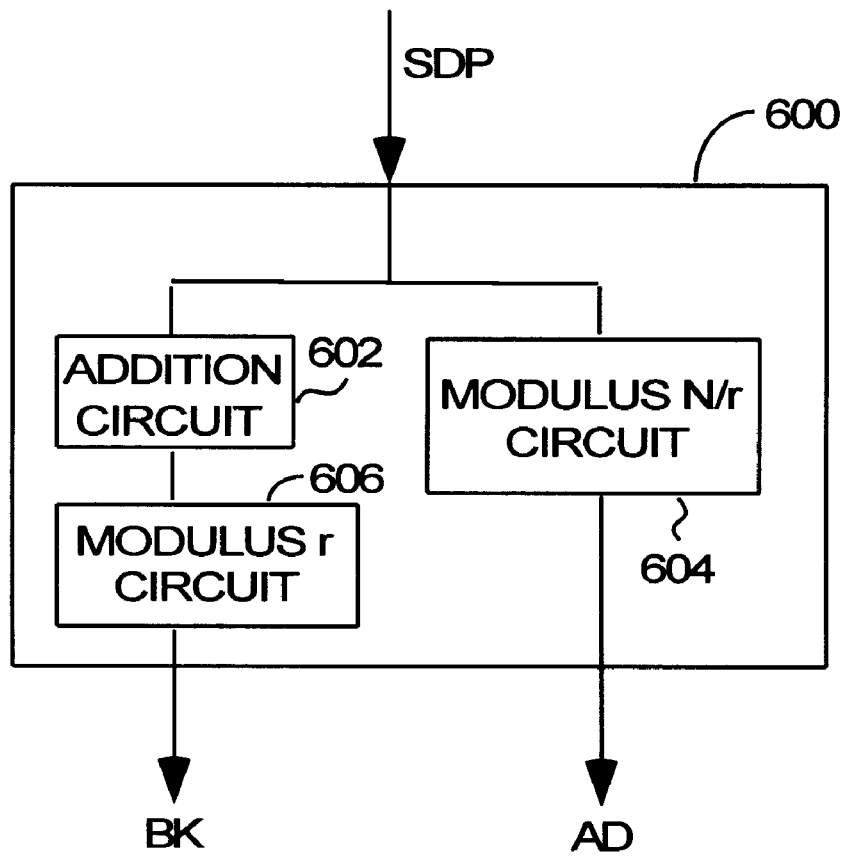
FIG. 6A is a block diagram of an address converter according to an embodiment of the invention.

FIG. 6A is a block diagram of an address converter 600 according to an embodiment of the invention. The address converter 600 illustrated in FIG. 6A is a detailed embodiment for one of the address converters 502–508 illustrated in FIG. 5. The address converter 600 includes an addition unit 602, a modulus N/r circuit 604, and a modulus r circuit 606. The operation of the address converter 600 is as follows. The address converter 600 receives a sequential data point (SDP) to be converted to a block (BK) and address (AD) for in a memory system having r banks. The sequential data point (SDP) is actually the sequential number for the data point. For example, in performing a 256-point FFT operation in a processor, the sequential data point (SDP) would begin at 0 and sequence by one up to 255. Hence, the sequential data point (SDP) could alternatively be generated by one or more counters internal to the address converter 600. The sequential data point (SDP) is supplied to the addition circuit 602 and the modulus N/r circuit 604. The addition circuit 602 performs addition of certain bits of the sequential data point (SDP) which is provided in a binary representation. Specifically, the addition circuit 602 performs the addition indicated in Equation (1) above and produces a sum. The modulus r circuit 604 receives the sum from the addition circuit 602, and then performs a modulus r operation on the sum as indicated in Equation (1) to output the block (BK) where the sequential data point (SDP) is to be stored. The modulus N/r circuit 604 performs a modulus N/r operation on the sequential data point (SDP) associated with Equation (2) above to output the address (AD). The discussion above concerning Table 2 illustrates the computations performed by the address converter 600 for two exemplary data samples.

Figure 6B:
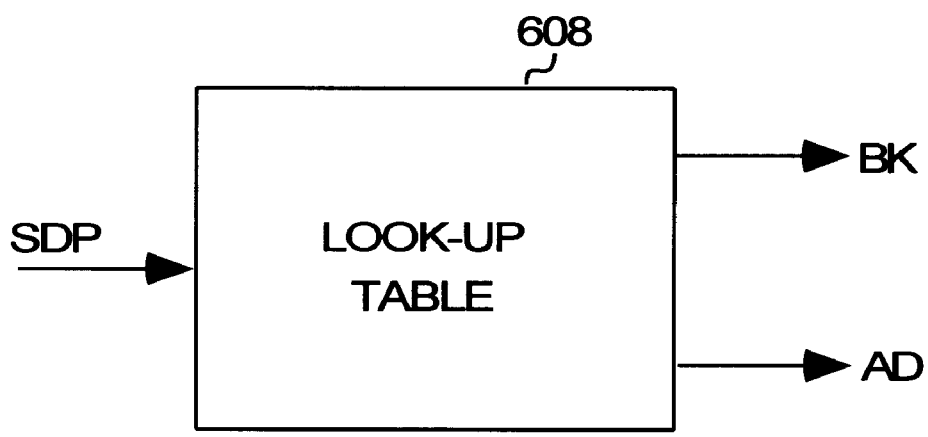
FIG. 6B is a block diagram of an address converter according to another embodiment of the invention.

FIG. 6B is a block diagram of an address converter 608 according to another embodiment of the invention. The address converter 608 can be used in place of the address converter 600 illustrated in FIG. 6A. The address converter 608 is a look-up table in which given a sequential data point (SDP), the appropriate bank (BK) and address (AD) can be look-up. Here, the address converter 608 is comprised of a memory in which the computations performed by the circuitry in the address converter 600 are already performed (i.e., pre-computed). In most cases, the address converter 600 will be preferable over the address converter (look-up table) 608 because it consumes less die area on manufactured integrated circuits and is faster.

In yet another embodiment, an address converter could be performed by software executing on a processor. The software would cause the processor to perform the operations of Equations (1) and (2) above.

Figure 7:
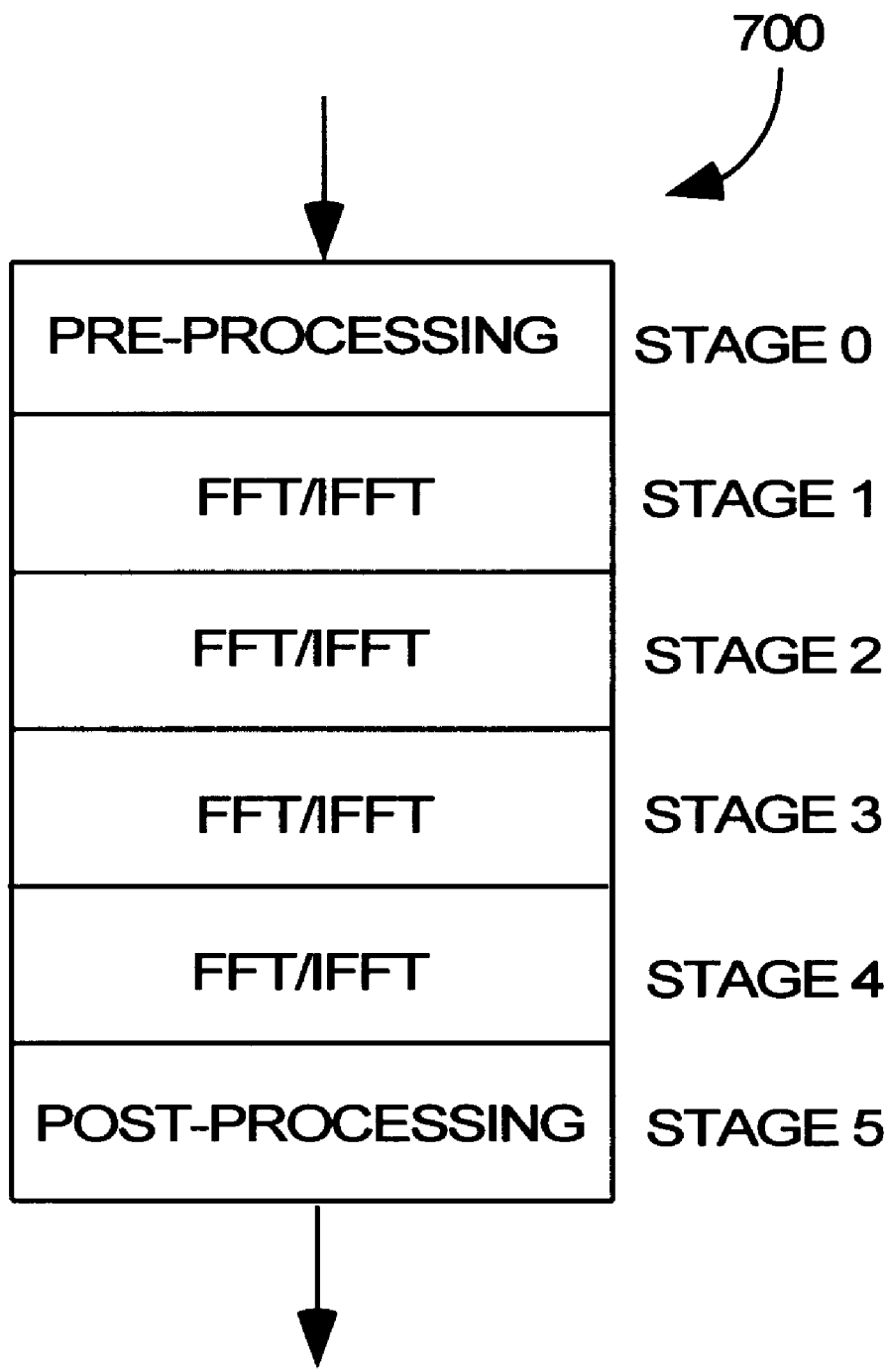
FIG. 7 is a detailed block diagram of a pipelined FFT/IFFT processor.

FIG. 7 is a detailed block diagram of a pipelined FFT/IFFT processor 700 according to an embodiment of the invention. As an example, the pipelined processor 700 can be used as the processor 216 in FIG. 2 or the FFT/IFFT processor 316 in FIG. 3. However, neither the processor 216 or the FFT/IFFT processor 316, are limited to processors that are pipelined or to the particular pipelined FFT/IFFT processor 700.

The pipelined FFT/IFFT processor 700 includes stages 0–5 that form a pipeline. The pipelined FFT/IFFT processor 700 is able to perform FFT or IFFT operations, thus making it suitable for use for both transmissions and receptions of data. Stage 0 performs pre-processing operations, stages 1–4 perform FFT or IFFT computations, and stage 5 performs post-processing operations.

Figure 8:
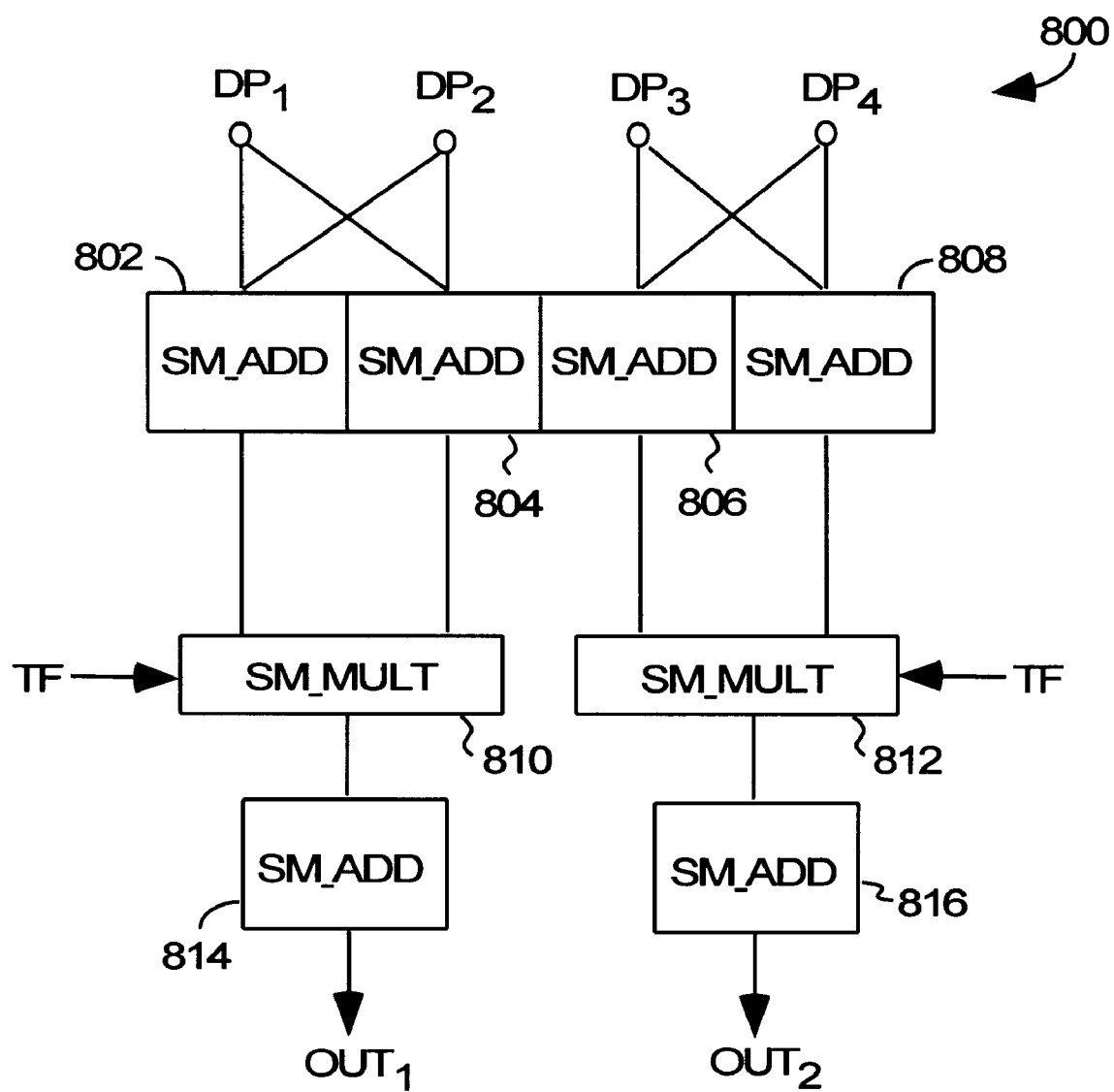
FIG. 8 is a detailed block diagram of a pre-processing stage according to an embodiment of the invention.

FIG. 8 is a detailed block diagram of a pre-processing stage 800 according to an embodiment of the invention. The pre-processing stage 800 can be used as the stage 0 in the pipelined processor 700. The pre-processing stage 800 receives four data points $DP_1$, $DP_2$, $DP_3$ and $DP_4$. The data points $DP_1$, $DP_2$, $DP_3$ and $DP_4$ are supplied to adders 802–808. The adders 802–808 are sign-magnitude adders which add the data points as if there where two complex numbers instead of four real numbers. The advantage of this approach is that the hardware required to perform a N-point FFT of radix-4 can be performed with N/2-point FFT hardware. The sums produced by the adders 802–808 are then supplied to multipliers 810 and 812. The multipliers 810 and 812 are sign-magnitude multipliers. The multiplier 810 multiplies the sums together from the adders 802 and 804, and the multiplier 812 multiplies the sums together from the adders 806 and 808. The multiplications by the multipliers 810 and 812 operate in accordance with twiddle factors (TF) which are known for a given FFT implementation. The outputs of the multipliers 810 and 812 are then added by the adders 814 and 816 which are sign-magnitude adders. The outputs $OUT_1$ and $OUT_2$ of the adders 814 and 816 are the output of the pre-processing stage 800.

Figure 9:
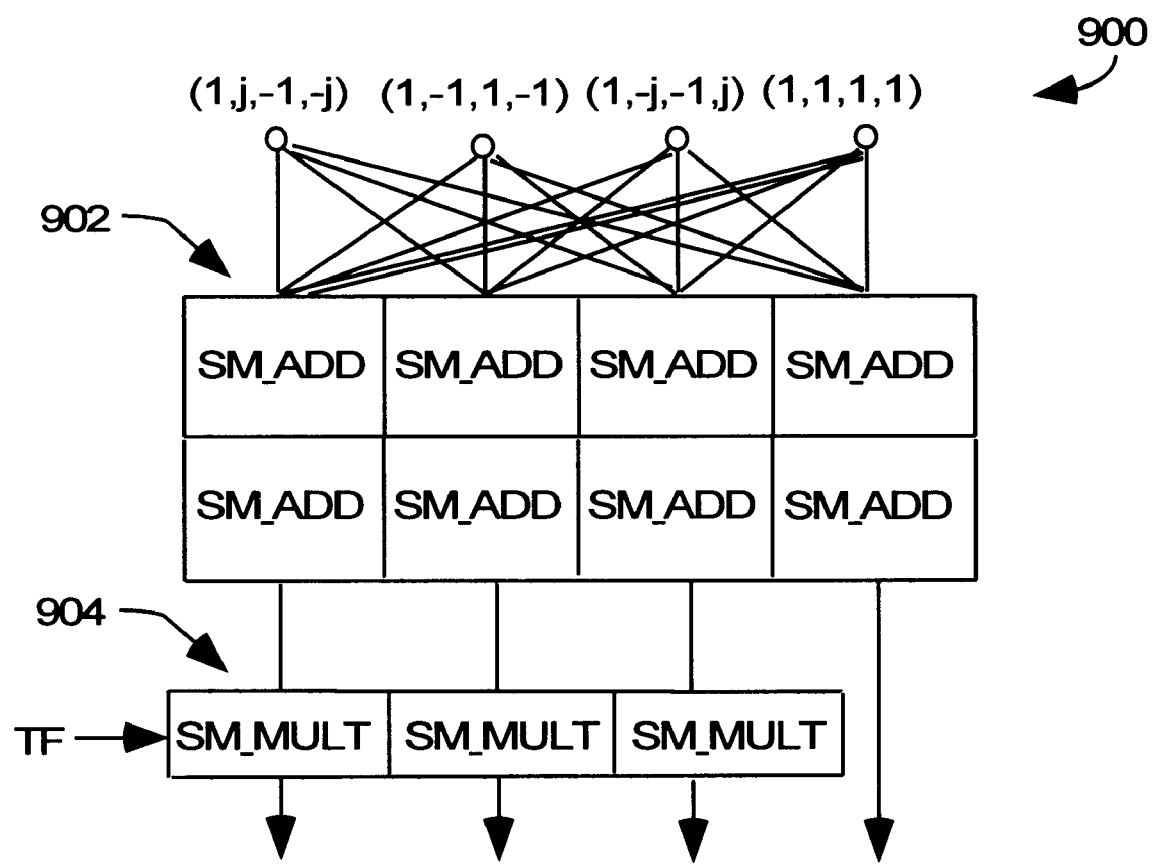
FIG. 9 is a detailed block diagram of a FFT/IFFT stage according to an embodiment of the invention.

FIG. 9 is a detailed block diagram of a FFT/IFFT stage 900 according to an embodiment of the invention. The FFT/IFFT stage 900 can be used for each of the stages 1–4 of the pipelined processor 700. The FFT/IFFT stage 900 includes a group of adders 902 that perform sign-magnitude additions, and a group of multipliers 904 that perform sign-magnitude multiplications. The stages 1–4 of the pipeline processor 700 primarily perform butterfly structured computations. The adders 902 perform additions for the butterfly structured computations, and the multipliers 904 weight the resulting sums from the adders 902 in accordance with the appropriate twiddle factors (TFs). The FFT/IFFT stage 900 performs radix-4 butterfly structured computations because four data points are input to the FFT/IFFT stage 900 at a time.

Figure 10:
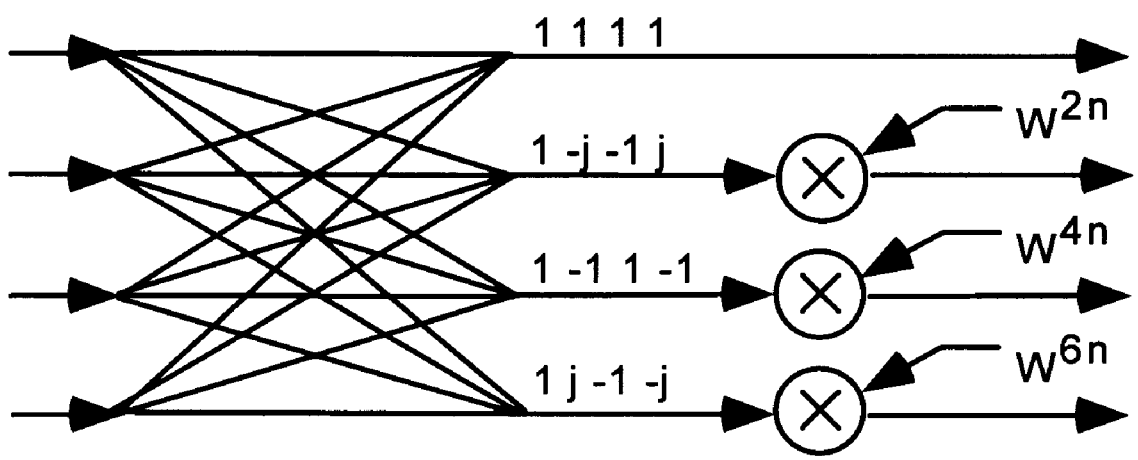
FIG. 10 is a diagram of a conventional radix-4 butterfly structure.

It is well known that butterfly structure computations are used to perform Fourier transforms. FIG. 10 is a diagram of a conventional radix-4 butterfly structure 1000. Additional details on butterfly structures and computation of Fourier transforms can be found in Oppenheim et al., "Digital Signal Processing," Prentice-Hall Inc. (1975), which is hereby incorporated by reference.

In the case in which a superframe structure is used to transmit the data, the processing according to the invention can operate on the superframe and can allow the format of the superframe to be selected and changed. As an example, the processing system according to the invention can include control registers that store a superframe format indicator and a superframe synchronization indicator. These indicators enable the processing system to change its processing in accordance with the superframe format and superframe synchronization. In particular, the processing system according to the invention can program the number of symbols in a particular superframe, and can adjust the superframe boundary during steady state operation. In general, a superframe includes a plurality of symbols or frames, including at least one transmit frame, at least one receive frame, and at least one quiet period.

In one embodiment, the processing system is capable of performing both transmit (TX) and receive (RX) operations. With transmit operations, the processing system performs IFFT operations, and with receive operations the processing system performs FFT operations. Although the processing system can perform both transmit and receive operations, the order, number and timing of each operation is variable. In particular, a series of control registers define a superframe and set the order number and timing of each operation. Representative superframe control registers are provided in Table 3 below.

TABLE 3

| REGISTER NAME | CONTENTS |
| --- | --- |
| TX_START | Starting position of IFFT operation with respect to superframe boundary |
| TX_STOP | Stopping position of IFFT operation with respect to superframe boundary |
| RX_START | Starting position of FFT operation with respect to superframe boundary |
| RX_STOP | Stopping position of FFT operation with respect to superframe boundary |
| SYM_IN_SP | Number of symbols (frames) in superframe |

The superframe control registers setup a basic framework (e.g., order and number) for the processing system for the operations to be performed in processing a superframe. An additional control register can also be provided to allow the processing system to adjust the superframe boundary during steady state. A representative boundary adjustment control register is provided in Table 4 below.

TABLE 4

| REGISTER NAME | CONTENTS |
| --- | --- |
| SFB_MOVE | An integer number specifying an amount to move the superframe boundary forward or backwards |

The actual starting and stopping of the FFT or IFFT operations is affected by the position of the superframe boundary signal. Hence, the ability to move the superframe boundary allows the timing of the operations to be changed.

Figure 11:
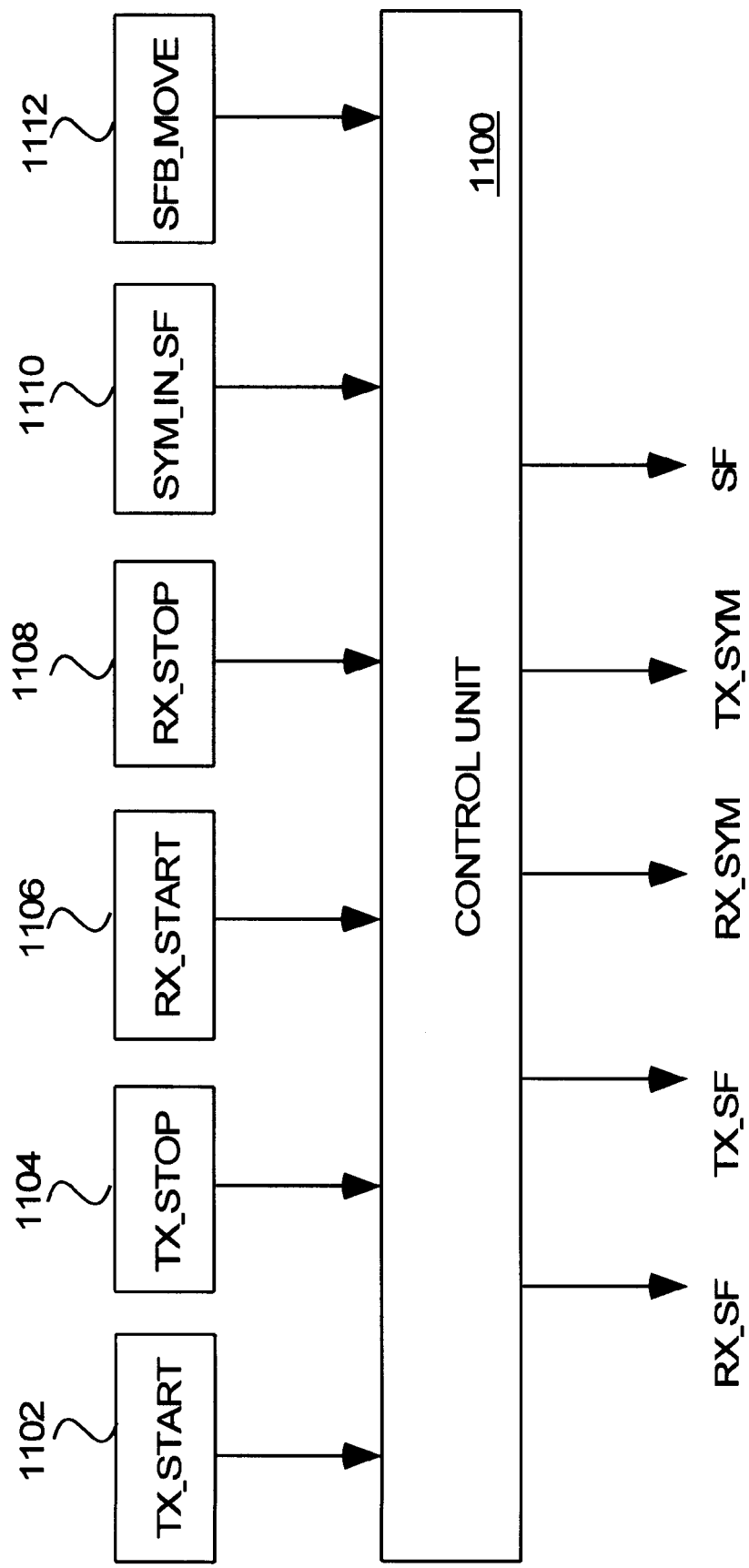
FIG. 11 is a block diagram of a control unit for controlling the processing performed by the processing system according to an embodiment of the invention.

These control registers are supplied to a control unit of the processing system. FIG. 11 is a block diagram of a control unit 1100 for controlling the processing performed by the processing system according to an embodiment of the invention. The control unit receives the superframe control information from the superframe control registers 1102–1112 and produces control signals. In this embodiment, the control signals include TX_SF, RX_SF, TX_SYM, RX_SYM and SF. The TX_SF signal indicates IFFT operation within superframe, and the TX_SYM signal indicates IFFT operation in symbol. The RX_SF signal indicates FFT operation within superframe, and the RX_SYM signal indicates FFT operation in symbol. The SF control signal indicates that the processing of the superframe is active.

The utilization, selection and alignment of superframes is discussed in more detail in U.S. application Ser. No. 08/855,881, filed May 12, 1997, and entitled METHOD AND APPARATUS FOR SUPERFRAME BIT ALLOCATION.

Accordingly, the invention provides a generalized processing architecture for providing a FFT processor of any radix with a variety of memory system arrangements. The address transformation process described above as part of the generalized processing architecture defines a framework suitable for generating multiple flavors of FFT/IFFT processors, minimizing area and cost and optimizing speed of FFT operations. Additionally, the generalized architecture can have improved throughput by pipelining the FFT and/or IFFT operations. As an example, in a FFT processor according to the invention that processes symbols of a data transmission system, the throughput improvement provided by the invention is on the order of 300%.

The invention has numerous advantages. One advantage of the invention is more efficient and less costly processing of Fourier transform operations. Another advantage of the invention is that a memory system may only need one port per memory bank which results in a reduction in power and size of memory required, yet in-place computation is available. Another advantage of the invention is that the data samples are stored in the memory system in a non-sequential manner such that the data points can be easily fetched from the memory system in the order in which the FFT/IFFT processor requires them. Still another advantage of the invention is that complicated routing networks are not needed. Yet another advantage of the invention is that pipelined operation is facilitated such that multiple symbols can be concurrently processed, even a mixture of receive (FFT) and transmit (IFFT) symbols. Another advantage of the invention is that the superframe can be easily changed or boundary adjusted.

In a VDSL system, the invention offers additional advantages. One advantage of the invention is that an FFT operation and an IFFT operation can be performed back to back in the pipeline processor. By being able to perform such back to back operations, the pipeline processor can be shared by a transmitter and a receiver within a transceiver, and can rapidly process a superframe structure having downstream and upstream frames. Another advantage of the invention is that the pipeline processor is programmable to accept a variety of different superframe formats. In addition, the number of symbols in a superframe, i.e., the length of the superframe, is programmable.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A data processing apparatus for a data transmission system, said data processing apparatus comprising:

an input buffer that stores data samples for a symbol in a sequential manner;

a first address transformer, said first address transformer operates to transform the sequential manner of the data samples into a non-sequential manner such that sequential addresses of the data samples for the symbol stored in said input buffer are transformed into non-sequential addresses;

a memory system having n-banks of memory, said memory system stores the data samples from said input buffer to said n-bank memory system in accordance with the non-sequential addresses produced by said first address transformer;

a processor, said processor operates to compute output samples for the symbol, with said processor producing n-output samples using one of the data samples in each of the n-banks of memory of said memory system;

a second address transformer, said second address transformer operates to transform the non-sequential manner of the output samples into a sequential manner; and an output buffer, said output buffer stores the output data samples in the sequential manner, wherein said data processing apparatus can perform either a Fast Fourier Transform (FFT) or an Inverse Fast Fourier Transform (IFFT) on the symbol stored in said input buffer, and wherein said processor is pipelined and thus enables concurrent FFT and IFFT processing on different symbols.

2. An apparatus as recited in claim 1, wherein said apparatus further comprises:

means for storing the output data samples in said memory system in the respective addresses from which the data samples used to produce the output data samples where retrieved from.

3. An apparatus as recited in claim 1, wherein said processor performs a Fourier transform operation on the one of the data samples retrieved from each of the n-banks of memory of said memory system.

4. An apparatus as recited in claim 1, wherein each bank of said memory system includes only a single input port and a single output port.

5. An apparatus as recited in claim 1, wherein the transforming from the sequential addresses to the non-sequential addresses by said first address transformer is determined based on a number of banks of the n-bank memory system and a radix of computation by said processor.

6. An apparatus as recited in claim 1, wherein said processor performs Fast Fourier Transform (FFT) operations, and wherein, for a given size FFT and a given radix, the address transformations provided by said first address transformer provides optimal addressing for said memory system.

7. An apparatus as recited in claim 1, wherein said processor receives n-data samples from said memory system, and performs at least n-sign-magnitude additions of the data samples by treating the n-data samples as complex numbers even though the n-data samples are real numbers, thereby reducing hardware requirements.

8. An apparatus as recited in claim 7, wherein said processor further performs at least n/2-sign-magnitude multiplications using the complex results from said n-sign-magnitude additions.

9. An apparatus for a data transmission system, said data processing apparatus comprising:

an input buffer that stores data samples for a symbol in a sequential manner;

a first address transformer, said first address transformer operates to transform the sequential manner of the data samples into a non-sequential manner such that sequential addresses of the data samples for the symbol stored in said input buffer are transformed into non-sequential addresses;

a memory system having n-banks of memory, said memory system stores the data samples from said input buffer to said n-bank memory system in accordance with the non-sequential addresses produced by said first address transformer;

a processor, said processor operates to compute output samples for the symbol, with said processor producing n-output samples using one of the data samples in each of the n-banks of memory of said memory system;

a second address transformer, said second address transformer operates to transform the non-sequential manner of the output samples into a sequential manner; and an output buffer, said output buffer stores the output data samples in the sequential manner, wherein said apparatus [is] concurrently operates on at least three symbols, data samples for a first symbol being stored in said input buffer, data samples for a second symbol being stored in said memory system, and data samples for a third symbol being stored in said output buffer, and wherein the first, second and third symbols can be any combination of Fast Fourier Transform (FFT) or Inverse Fast Fourier Transform (IFFT) operations thereby allowing back to back processing of FFT and IFFT operations by said apparatus.

10. An apparatus as recited in claim 9, wherein said processor begins processing output samples after an initial portion of the second symbol has been stored in said memory system and before the second symbol is completely stored into said memory system.

11. An apparatus as recited in claim 9, wherein said processor receives n-data samples from said memory system, and performs at least n-sign-magnitude additions of the data samples by treating the n-data samples as complex numbers even though the n-data samples are real numbers, thereby reducing hardware requirements.

12. An apparatus as recited in claim 11, wherein said processor further performs at least n/2-sign-magnitude multiplications using the complex results from said n-sign-magnitude additions.

13. A data processing apparatus for a data transmission system, said data processing apparatus comprising:

an input buffer that stores data samples for a symbol in a sequential manner;

a first address transformer, said first address transformer operates to transform the sequential manner of the data samples into a non-sequential manner such that sequential addresses of the data samples for the symbol stored in said input buffer are transformed into non-sequential addresses;

a memory system having n-banks of memory, said memory system stores the data samples from said input buffer to said n-bank memory system in accordance with the non-sequential addresses produced by said first address transformer;

a processor, said processor operates to compute output samples for the symbol, with said processor producing n-output samples using one of the data samples in each of the n-banks of memory of said memory system;

a second address transformer, said second address transformer operates to transform the non-sequential manner of the output samples into a sequential manner; and an output buffer, said output buffer stores the output data samples in the sequential manner, wherein said data processing apparatus can perform either a Fast Fourier Transform (FFT) or an Inverse Fast Fourier Transform (IFFT) on the symbol stored in said input buffer, wherein the data transmission system uses a superframe for the data transmissions, the superframe includes at least one transmit frame, at least one receive frame, and at least one quiet period, and wherein said apparatus further comprises programmable control registers for defining the superframe for the data transmissions, thus allowing said apparatus to operate on various superframe formats.

14. An apparatus as recited in claim 13, wherein the superframe has a superframe boundary associated therewith, and wherein said apparatus further comprises a superframe boundary register for indicating an adjustment amount to the superframe boundary.

15. A data processing apparatus for a data transmission system that uses a superframe for data transmissions, the superframe including at least one transmit frame, at least one receive frame and at least one quiet period, said data processing apparatus comprising:

an input buffer that stores data samples for a symbol;

a memory system, said memory system stores the data samples from said input buffer;

programmable control registers for defining the superframe for the data transmissions, said control registers define the superframe such that the number of transmit frames within the superframe and the number of receive frames within the superframe are determinable, thus allowing said apparatus to operate on various superframe formats;

a processor, said processor operates to compute output samples for the superframe in accordance with said control registers; and an output buffer, said output buffer stores the output data samples.

16. An apparatus as recited in claim 15, wherein the superframe has a superframe boundary associated therewith, wherein said apparatus further comprises a superframe boundary register for indicating an adjustment amount to the superframe boundary, and wherein said processor operates to compute the output samples for the superframe in accordance with said control registers and said superframe boundary register.

17. An apparatus as recited in claim 15, wherein said memory system includes n-banks of memory, and wherein said processor operates to compute the output samples for the superframe, with said processor producing n-output samples using one of the data samples in each of the n-banks of memory of said memory system.

18. An apparatus as recited in claim 15, wherein said processor performs a one of a Fast Fourier Transform (FFT) and an Inverse Fast Fourier Transform (IFFT) operation.

19. An apparatus as recited in claim 15, wherein said processor is pipelined.

20. An apparatus as recited in claim 15, wherein said processor receives a set of the data samples from said memory system, and performs at least one addition of the data samples in the set using sign-magnitude format even though the data samples are real numbers.

21. An apparatus as recited in claim 20, wherein said processor performs at least a pair of additions of the data samples in the set using the sign-magnitude format to produce data sample sums, and thereafter said processor further performs at least one multiplication of the data sample sums.

\* \* \* \* \*